(12) United States Patent
Chatterji et al.

(10) Patent No.: US 7,407,916 B2
(45) Date of Patent: *Aug. 5, 2008

(54) FOAMED TREATMENT FLUIDS AND ASSOCIATED METHODS

(75) Inventors: Jiten Chatterji, Duncan, OK (US);
Karen L. King, Duncan, OK (US);
Bobby J. King, Duncan, OK (US);
Stanley J. Heath, Duncan, OK (US);
Chad Brenneis, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/354,418

(22) Filed: Feb. 15, 2006

(65) Prior Publication Data

US 2007/0203029 A1    Aug. 30, 2007

(51) Int. Cl.
*C09K 8/68* (2006.01)
*C09K 8/70* (2006.01)

(52) U.S. Cl. .................. 507/240; 507/244; 507/245; 507/247; 507/254; 507/261; 166/283; 166/309

(58) Field of Classification Search ............... 507/245, 507/247, 254
See application file for complete search history.

(56) References Cited

U.S. PATENT DOCUMENTS

| | | | | |
|---|---|---|---|---|
| 4,741,782 A | | 5/1988 | Styron | 588/257 |
| 5,079,036 A | | 1/1992 | Roe et al. | 427/212 |
| 5,275,654 A | | 1/1994 | Cowan | 106/661 |
| 5,588,489 A | * | 12/1996 | Chatterji et al. | 166/293 |
| 5,711,801 A | * | 1/1998 | Chatterji et al. | 106/789 |
| 5,820,670 A | * | 10/1998 | Chatterji et al. | 106/737 |
| 5,875,845 A | * | 3/1999 | Chatterji et al. | 166/293 |
| 5,897,699 A | * | 4/1999 | Chatterji et al. | 106/678 |
| 6,051,214 A | * | 4/2000 | Isbell et al. | 424/70.21 |
| 6,063,738 A | | 5/2000 | Chatterji et al. | 507/269 |
| 6,162,775 A | * | 12/2000 | Methmanus-Spaltro | 510/130 |
| 6,210,476 B1 | * | 4/2001 | Chatterji et al. | 106/677 |
| 6,457,524 B1 | | 10/2002 | Roddy | 166/293 |
| 6,734,146 B2 | | 5/2004 | Chatterji et al. | 507/202 |
| 6,951,249 B1 | * | 10/2005 | Chatterji et al. | 166/293 |
| 7,008,477 B2 | * | 3/2006 | Chatterji et al. | 106/678 |

(Continued)

OTHER PUBLICATIONS

Reidenbach et al., *Rheological Study of Foam Fracturing Fluids Using Nitrogen and Carbon Dioxide*; SPE 12026-PA, SPE Production Engineering, Jan. 1986, vol. 1, pp. 31-41.

(Continued)

*Primary Examiner*—Randy Gulakowski
*Assistant Examiner*—John J Figueroa
(74) *Attorney, Agent, or Firm*—Robert A. Kent; Baker Botts LLC (57) ABSTRACT

Foamed treatment fluids comprising water, a gas, and a foaming and foam stabilizing surfactant mixture comprising an alkali salt of an alkyl ether sulfate, wherein the alkali salt of the alkyl ether sulfate comprises an alkali salt of a $C_{6-10}$ alkyl ether sulfate, and an alkali salt of a $C_4$ alkyl ether sulfate, an alkyl amidopropyl amphoteric surfactant selected from the group consisting of an alkyl amidopropyl hydroxysultaine, an alkyl amidopropyl betaine, and combinations thereof, and an alkyl amidopropyl dimethylamine oxide. Methods comprising providing the foamed treatment fluid and introducing the foamed treatment fluid into a subterranean formation.

20 Claims, 3 Drawing Sheets

U.S. PATENT DOCUMENTS

| | | | |
|---|---|---|---|
| 7,013,975 B2 * | 3/2006 | Chatterji et al. | 166/293 |
| 7,077,203 B1 * | 7/2006 | Roddy et al. | 166/293 |
| 7,134,497 B1 * | 11/2006 | Chatterji et al. | 166/308.6 |
| 7,255,170 B2 * | 8/2007 | Chatterji et al. | 166/293 |
| 7,287,594 B1 * | 10/2007 | Chatterji et al. | 166/308.6 |
| 2004/0121917 A1 * | 6/2004 | Pakulski | 507/239 |
| 2004/0167248 A1 * | 8/2004 | Brothers et al. | 523/130 |
| 2004/0177963 A1 * | 9/2004 | Chatterji et al. | 166/293 |
| 2004/0182577 A1 * | 9/2004 | Chatterji et al. | 166/305.1 |
| 2004/0226484 A1 * | 11/2004 | Chatterji et al. | 106/805 |
| 2005/0250666 A1 | 11/2005 | Gatlin et al. | |
| 2006/0016601 A1 | 1/2006 | Chatterji et al. | 166/292 |
| 2006/0016602 A1 | 1/2006 | Chatterji et al. | 166/293 |
| 2006/0090895 A1 * | 5/2006 | Chatterji et al. | 166/278 |
| 2007/0056733 A1 * | 3/2007 | Roddy et al. | 166/293 |
| 2007/0056734 A1 * | 3/2007 | Roddy et al. | 166/293 |

OTHER PUBLICATIONS

U.S. Appl. No. 11/355,059, filed Feb. 15, 2006, Chatterji.
Notice of allowance dated Aug. 9, 2006 from U.S. Appl. No. 11/355,059.
Notice of allowance dated Jul. 3, 2006 from U.S. Appl. No. 11/355,059.
Office action dated May 12, 2006 from U.S. Appl. No. 11/355,059.
Notice of allowance dated Sep. 11, 2007 from U.S. Appl. No. 11/454,236.
Office action dated May 31, 2007 from U.S. Appl. No. 11/454,236.

* cited by examiner

FOAMED TREATMENT FLUIDS AND ASSOCIATED METHODS

CROSS-REFERENCE TO RELATED APPLICATIONS

The present invention is related to U.S. patent application Ser. No. 11/355,059, entitled "Foamed Treatment Fluids and Associated Methods," filed on the same date herewith, the entire disclosure of which is incorporated herein by reference.

BACKGROUND

The present invention relates to foamed treatment fluids and, more particularly, to foaming and foam stabilizing surfactant mixtures for use in treatment fluids and associated methods.

Foamed treatment fluids may be used in a variety of subterranean treatments, such as drilling operations, well bore cleanup operations, hydraulic fracturing, fracture acidizing, sand control treatments, and the like. As used herein, a "treatment fluid" refers to any fluid used in subterranean treatments for a desired function and/or a desired purpose and does not imply any particular action by the fluid. A foamed treatment fluid may be prepared by mixing an aqueous fluid containing a foaming and foam stabilizing surfactant mixture with a gas (such as air, nitrogen, carbon dioxide, or combinations thereof). Generally, the foaming and foam stabilizing surfactant mixture facilitates the foaming of the aqueous fluid and also may stabilize the resultant foamed fluid formed therewith. Foamed treatment fluids may effectively carry particulates and also may require a smaller amount of gelling agent, reducing the amount of residue left in the subterranean formation by the gelling agent. Additionally, foamed treatment fluids have low fluid loss properties, potentially reducing or removing the need for a fluid loss control additive. Furthermore, foaming a treatment fluid generally reduces the water requirement, thereby minimizing problems associated with clay swelling.

Hydraulic fracturing is a process commonly used to increase the flow of desirable fluids, such as oil and gas, from a portion of a subterranean formation. Hydraulic fracturing operations generally involve introducing a foamed treatment fluid (e.g., a foamed fracturing fluid) into a subterranean formation at or above a pressure sufficient to create or enhance one or more fractures in the formation. Enhancing a fracture includes enlarging a pre-existing fracture in the formation. The foamed treatment fluid may comprise particulates, often referred to as "proppant particulates," that are deposited in the fractures. The proppant particulates function to prevent the fractures from fully closing upon the release of pressure, forming conductive channels through which fluids may flow to (or from) the well bore. After the fracturing operation is complete, the pressure on the well bore is released. This allows the gas in the foamed treatment fluid to expand and, with this expansion, the energized foamed treatment fluid flows from the formation, flows into the well bore, and exits the well bore at the surface.

Foamed treatments fluids also may be used in sand control treatments, such as gravel packing. In gravel pack treatments, the foamed treatment fluid suspends gravel particulates for delivery to a desired area in a well bore, e.g., near unconsolidated or weakly consolidated formation zones, to form a gravel pack that enhances sand control. One common type of gravel packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the gravel particulates from entering the production tubing. Once the gravel pack is substantially in place, the pressure on the well bore is released. This allows the gas in the foamed treatment fluid to expand and, with this expansion, the foamed treatment fluid flows from the formation, into the well bore, and exits the well bore at the surface.

While foamed treatment fluids have been used previously, the use of certain conventional foaming and foam stabilizing surfactant mixtures has been problematic. For example, foamed treatment fluids, that contain certain conventional foaming and foam stabilizing surfactant mixtures (e.g., alcohol ether sulfates by themselves) in general, tend to destabilize when contacted by small quantities of oil. Accordingly, when used in hydrocarbon-bearing formations, these foamed treatment fluids may prematurely destabilize resulting in an undesired loss of viscosity. This premature loss of viscosity may be problematic, for example, the proppant or gravel particulates may not be deposited in the desired location in the formation.

SUMMARY

The present invention relates to foamed treatment fluids and, more particularly, to foaming and foam stabilizing surfactant mixtures for use in treatment fluids and associated methods.

In one embodiment, the present invention provides a foamed treatment fluid comprising water; a gas; and a foaming and foam stabilizing surfactant mixture comprising an alkali salt of an alkyl ether sulfate, wherein the alkali salt of the alkyl ether sulfate comprises an alkali salt of a $C_{6-10}$ alkyl ether sulfate, and an alkali salt of a $C_4$ alkyl ether sulfate, an alkyl amidopropyl amphoteric surfactant selected from the group consisting of an alkyl amidopropyl hydroxysultaine, an alkyl amidopropyl betaine, and combinations thereof, and an alkyl amidopropyl dimethylamine oxide.

In another embodiment, the present invention provides a foamed fracturing fluid comprising water; a gas; and a foaming and foam stabilizing surfactant mixture comprising an alkali salt of an alkyl ether sulfate, wherein the alkali salt of the alkyl ether sulfate comprises an alkali salt of a $C_{6-10}$ alkyl ether sulfate, and an alkali salt of a $C_4$ alkyl ether sulfate, an alkyl amidopropyl amphoteric surfactant selected from the group consisting of an alkyl amidopropyl hydroxysultaine, an alkyl amidopropyl betaine, and combinations thereof, and an alkyl amidopropyl dimethylamine oxide; and proppant particulates.

In another embodiment, the present invention provides a foamed treatment fluid comprising water, a gelling agent, a gas, and a foaming and foam stabilizing surfactant mixture comprising an ammonium salt of an alkyl ether sulfate, wherein the ammonium salt of the alkyl ether sulfate comprises an ammonium salt of a $C_{6-10}$ alkyl ether sulfate having in the range of from about 1.5 moles to about 2 moles of ethylene oxide substitution, and an alkali salt of a $C_4$ alkyl ether sulfate having in the range of from about 1.8 moles to about 2.5 moles of ethylene oxide substitution, a cocamidopropyl amphoteric surfactant selected from the group consisting of a cocamidopropyl hydroxysultaine, a cocamidopropyl betaine, and combinations thereof, and a cocamidopropyl dimethylamine oxide.

The features and advantages of the present invention will be apparent to those skilled in the art. While numerous changes may be made by those skilled in the art, such changes are within the spirit of the invention.

BRIEF DESCRIPTION OF THE FIGURES

These figures illustrate certain aspects of some of the embodiments of the present invention, and should not be used to limit or define the invention.

DESCRIPTION OF PREFERRED EMBODIMENTS

The present invention relates to foamed treatment fluids and, more particularly, to foaming and foam stabilizing surfactant mixture for use in treatment fluids and associated methods. While the methods and compositions of the present invention are useful in a variety of subterranean treatments where foamed treatment fluids may be used, they are particularly useful in hydraulic fracturing.

I. Foaming and Foam Stabilizing Surfactant Mixture

The foaming and foam stabilizing surfactant mixture used in the foamed treatment fluids of the present invention generally comprises an alkali salt of an alkyl ether sulfate, an alkyl amidopropyl amphoteric surfactant, and an alkyl amidopropyl dimethylamine oxide, wherein the alkali salt of the alkyl ether sulfate comprises an alkali salt of a $C_{6-10}$ alkyl ether sulfate, and an alkali salt of a $C_4$ alkyl ether sulfate. The alkyl amidopropyl amphoteric surfactant comprises an alkyl amidopropyl hydroxysultaine, an alkyl amidopropyl betaine, or combinations thereof. Among other things, the foaming and foam stabilizing surfactant mixture useful in the foamed treatment fluids of the present invention may facilitate the foaming of a treatment fluid and also stabilize the resultant foamed treatment fluid formed therewith.

The alkali salt of an alkyl ether sulfate present in the foaming and foam stabilizing surfactant mixture included in the foamed treatment fluids of the present invention generally comprises an alkali salt of a $C_{6-10}$ alkyl ether sulfate and an alkali salt of a $C_4$ alkyl ether sulfate. The alkali salt may be any suitable alkali salt, including a sodium salt, a potassium salt, an ammonium salt, or combinations thereof. In certain embodiments, the alkali salt is an ammonium salt. The alkali salt of an alkyl ether sulfate should be present in the foaming and foam stabilizing surfactant mixture in an amount sufficient to provide the desired foaming properties. In some embodiments, the alkali salt of an alkyl ether sulfate may be present in the foaming and foam stabilizing surfactant mixture of the present invention in an amount in the range of from about 60% to about 75% by weight of the surfactant mixture.

Generally, the alkali salt of a $C_{6-10}$ alkyl ether sulfate may be substituted with an amount of ethylene oxide sufficient to provide the desired foaming properties. In certain embodiments, the alkali salt of a $C_{6-10}$ alkyl ether sulfate may have in the range of from about 1.5 moles to about 2 moles of ethylene oxide substitution. In some embodiments, the alkali salt of a $C_{6-10}$ alkyl ether sulfate may be present in the alkali salt of an alkyl ether sulfate in an amount in the range of from about 65% to about 90% by weight of the alkali salt of an alkyl ether sulfate.

Generally, the alkali salt of a $C_4$ alkyl ether sulfate may be substituted with an amount of ethylene oxide sufficient to provide the desired foaming properties. In certain embodiments, the $C_4$ alkyl ether sulfate may have in the range of from about 1.8 moles to about 2.5 moles of ethylene oxide substitution. In some embodiments, the alkali salt of a $C_4$ alkyl ether sulfate may be present in the alkali salt of an alkyl ether sulfate in an amount in the range of from about 10% to about 35% by weight of the alkali salt of an alkyl ether sulfate.

In some embodiments, the alkali salt of an alkyl ether sulfate may further comprise an ammonium sulfate. Where present, the ammonium sulfate generally is a by product of the neutralization of the acid during production of an ammonium salt. In some embodiments, the ammonium sulfate may be present in an amount in the range of from about 0.1% to about 1.5% by weight of the alkali salt of an alkyl ether sulfate.

The foaming and foam stabilizing surfactant mixture useful in the foamed treatment fluids of the present invention further comprises an alkyl amidopropyl amphoteric surfactant. The alkyl amidopropyl amphoteric surfactant comprises an alkyl amidopropyl hydroxysultaine, an alkyl amidopropyl betaine, or combinations thereof. The alkyl amidopropyl amphoteric surfactant should be present in the foaming and foam stabilizing surfactant mixture in an amount sufficient to provide the desired foam. In some embodiments, the alkyl amidopropyl amphoteric surfactant may be present in the foaming and foam stabilizing surfactant mixture of the present invention in an amount in the range of from about 15% to about 25% by weight of the surfactant mixture.

Suitable alkyl amidopropyl hydroxysultaines may comprise at least one radical selected from the group consisting of a decyl radical, a cocoyl radical, a lauryl radical, a cetyl radical, and an oleyl radical. One example of a suitable amidopropyl hydroxysultaine comprises a cocamidopropyl hydroxysultaine.

Suitable alkyl amidopropyl amphoteric surfactants include an alkyl amidopropyl betaine. Suitable alkyl amidopropyl betaines may comprise at least one radical selected from the group consisting of a decyl, a cocoyl, a lauryl, a cetyl, and an oleyl radical. One example of a suitable amidopropyl betaine comprises a cocamidopropyl betaine.

The foaming and foam stabilizing surfactant mixture used in the foamed treatment fluids of the present invention further comprises an alkyl amidopropyl dimethylamine oxide. Suitable alkyl amidopropyl dimethyl amine oxides may comprise at least one radical selected from the group consisting of a decyl, a cocoyl, a lauryl, a cetyl, and an oleyl radical. In certain embodiments, the amidopropyl dimethylamine oxide comprises a cocamidopropyl dimethylamine oxide. The amidopropyl dimethylamine oxide should be present in the foaming and foam stabilizing surfactant mixture in an amount sufficient to provide the desired foam stabilizing properties. In some embodiments, the amidopropyl dimethylamine oxide may be present in the foaming and foam stabilizing surfactant mixture in an amount in the range of from about 1% to about 10% by weight of the surfactant mixture. In some embodiments, the amidopropyl dimethylamine oxide may be present in the foaming and foam stabilizing surfactant mixture in an amount in the range of from about 1% to about 5% by weight of the surfactant mixture.

The foaming and foam stabilizing surfactant mixture used in the foamed treatment fluids optionally may comprise an alkali salt. Among other things, the alkali salt may be function as a freezing and/or pour point depression. Alkali salts that may be present include, but are not limited to, sodium chloride, ammonium chloride, potassium chloride, and combinations thereof. In some embodiments, the alkali salt may be present in an amount in the range of from about 10% to about 30% by weight of the surfactant mixture.

Generally, the foaming and foam stabilizing surfactant mixture, in some embodiments, may be provided in an aqueous mixture that may comprise water and the foaming and foam stabilizing surfactant mixture. The water used in this aqueous mixture may be freshwater, saltwater (e.g., water containing one or more salts dissolved therein), brine (e.g., saltwater produced from subterranean formations), seawater, or combinations thereof. Generally, the water may be from any source, provided that it does not contain an excess of compounds that adversely affect other components in the foaming and foam stabilizing surfactant mixture and/or the foamed treatment fluids of the present invention. The water should generally be present in the aqueous mixture in an amount sufficient to dissolve the components thereof as desired. In some embodiments, the water may be present in the aqueous mixture in an amount in the range of from about 35% to about 50% by weight of the aqueous mixture.

An example of a suitable foaming and foam stabilizing surfactant mixture of the present invention comprises about 66.48% by weight of an ammonium salt of an alkyl ether sulfate, about 16.07% by weight of a cocamidopropyl betaine, about 2.36% by weight of cocamidopropyl dimethylamine oxide, and about 14.99% by weight of sodium chloride, wherein the ammonium salt of the alkyl ether sulfate comprises about 75% by weight of an ammonium salt of a $C_{6-10}$ alkyl ether sulfate having about 1.8 moles of ethylene oxide substitution, and about 25% by weight of an ammonium salt of a $C_4$ alkyl ether sulfate having about 2 moles of ethylene oxide substitution. Such a foaming and foam stabilizing surfactant mixture may be provided in an aqueous mixture that comprises water in an amount of about 40.71% by weight.

An example of a suitable foaming and foam stabilizing surfactant mixture of the present invention comprises about 71.54% by weight of an ammonium salt of an alkyl ether sulfate, about 15.20% by weight of a cocamidopropyl hydroxysultaine, about 2.54% by weight of cocamidopropyl dimethylamine oxide, and about 10.71% by weight of sodium chloride, wherein the ammonium salt of the alkyl ether sulfate comprises about 75% by weight of an ammonium salt of a $C_{6-10}$ alkyl ether sulfate having about 1.8 moles of ethylene oxide substitution, and about 25% by weight of an ammonium salt of a $C_4$ alkyl ether sulfate having about 2 moles of ethylene oxide substitution. Such a foaming and foam stabilizing surfactant mixture may be provided in an aqueous mixture that comprises water in an amount of about 43.4% by weight.

II. Foamed Treatment Fluids

The foamed treatment fluids of the present invention generally comprise water, a gas, and a foaming and foam stabilizing surfactant mixture. Optionally, the foamed treatment fluids further may comprise a variety of additional additives, including, but not limited to, gelling agents and particulates (e.g., proppant particulates, gravel particulates, etc.).

The water used in the foamed treatment fluids of the present invention may include freshwater, saltwater (e.g., water containing one or more salts dissolved therein), brine (e.g., saltwater produced from subterranean formations), seawater, and combinations thereof. The water may be from any source, provided that it does not contain an excess of compounds that adversely affect the foamed treatment fluids of the present invention.

The gas used in the foamed fracturing of the present invention may be any gas suitable for foaming treatment fluids, including, but not limited to, air, carbon dioxide, nitrogen, or combinations thereof. Generally, the gas should be present in the foamed treatment fluids of the present invention in an amount sufficient to foam the treatment fluid. In certain embodiments, the gas may be present in the foamed treatment fluids of the present invention in an amount in the range of from about 10% to about 98% by volume of the water in the foamed treatment fluid. In certain embodiments, the gas may be present in the foamed treatment fluids of the present invention in an amount in the range of from about 50% to about 80% by volume of the water in the foamed treatment fluid.

The foamed treatment fluids of the present invention further comprise a foaming and foam stabilizing surfactant mixture. These foaming and foam stabilizing surfactant mixtures generally comprise an alkali salt of an alkyl ether sulfate, an alkyl amidopropyl amphoteric surfactant, and an alkyl amidopropyl dimethylamine oxide, wherein the alkali salt of the alkyl ether sulfate comprises an alkali salt of a $C_{6-10}$ alkyl ether sulfate, and an alkali salt of a $C_4$ alkyl ether sulfate. The alkyl amidopropyl amphoteric surfactant comprises an alkyl amidopropyl hydroxysultaine, an alkyl amidopropyl betaine, or combinations thereof. Suitable foaming and foam stabilizing surfactant mixtures are described in more detail above.

The foaming and foam stabilizing surfactant mixture should be included in the foamed treatment fluids in an amount sufficient to provide the desired foam. In some embodiments, the foaming and foam stabilizing surfactant mixture is present in the foamed treatment fluid in an amount in the range of from about 0.2% to about 2.0% by volume of the water included in the foamed treatment fluid.

Optionally, the foamed treatment fluids of the present invention further may comprise a gelling agent. As used herein, the phrase "gelling agent" refers to a material capable of gelling water, thereby increasing its viscosity. In some embodiments, a crosslinking agent may be included in the foamed treatment fluid for crosslinking the gelling agent and further increasing the viscosity of the fluid. Examples of suitable gelling agents include, but are not limited to, biopolymers (e.g., xanthan, succinoglycan, etc,), galactomannan gums, glucomannon gums, cellulose derivatives, combinations thereof, and the like. Suitable galactomannan gums include, but are not limited to, gum arabic, gum ghatti, gum karaya, tamarind gum, tragacanth gum, guar gum, locust bean gum, and the like. Suitable galactomannan gum derivatives include, but are not limited to, guar gum derivatives, such as hydroxypropylguar ("HPG"), carboxymethylhydroxypropylguar ("CMHPG"), and carboxymethylguar ("CMG"). An example of a suitable CMHPG in an about 40% to about 50% by weight oil suspension is LGC-IV™ TM gelling agent from Halliburton Energy Services, Inc., Duncan, Okla. Cellulose derivatives (such as cellulose ethers) are also suitable for use as gelling agents in accordance with the present invention. Suitable cellulose derivatives include, but are not limited to, hydroxyethylcellulose, carboxymethylhydroxyethylcellulose, hydroxyethylcellulose grafted with vinylphosphonic acid, combinations thereof, and the like. Other examples of suitable gelling agents include, but are not limited to, water dispersible hydrophilic organic polymers (e.g., polyacrylamide and polymethacrylamide), certain water-soluble polymers, and polymerizable water-soluble monomers (e.g., acrylic acid, methacrylic acid, acrylamide, methacrylamide, etc.). Combinations of suitable gelling agents also may be used.

Where used, the gelling agent should be included in the foamed treatment fluids of the present invention in an amount sufficient to provide a desired viscosity. In certain embodiments, the gelling agent should be present in the foamed treatment fluids of the present invention in amount in the range of from about 0.01% to about 0.375% by weight of the water in the foamed treatment fluid.

Optionally, the foamed treatment fluids of the present invention further may comprise particulates (e.g., proppant particulates, gravel particulates, etc.) Particulates suitable for use in the present invention may comprise any material suitable for use in subterranean operations. Suitable particulate materials include, but are not limited to, sand; bauxite; ceramic materials; glass materials; polymer materials; an alloy of amorphous polyphenylene; crystalline polyamide; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates; and combinations thereof. Suitable composite particulates may comprise a binder and a filler material wherein suitable filler materials include silica, alumina, carbon black, graphite, mica, titanium dioxide, talc, zirconia, glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In particular embodiments, preferred particulates size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials) and mixtures thereof. Moreover, fibrous materials, that may or may not be used to bear the pressure of a closed fracture, are often included in fracturing and sand control treatments. Generally, the particulates may be included in the foamed treatment fluids of the present invention in an amount suitable for a particular application. In certain embodiments, particulates may be present in the foamed treatment fluids of the present invention in an amount in the range of from about 1 pounds per gallon ("ppg") to about 20 ppg of the aqueous liquid. In certain embodiments, particulates may be present in the foamed treatment fluids of the present invention in an amount in the range of from about 3 ppg to about 10 ppg.

The foamed treatment fluids of the present invention may optionally comprise additional additives, including, but not limited to, gel breakers (e.g., enzymes, oxidizers, acids, etc.) fluid loss control additives, corrosion inhibitors, crosslinking agents, scale inhibitors, catalysts, clay control agents, biocides, friction reducers, and combinations thereof. Individuals skilled in the art, with the benefit of this disclosure, will recognize the types and amounts of additives that may be necessary for inclusion in the foamed treatment fluids of the present invention for a particular application.

The foamed treatment fluids of the present invention may be used in a variety of subterranean treatment for which foamed fluids are suitable. Examples of such treatments include, but are not limited to, drilling operations, well bore cleanup operations, hydraulic fracturing, fracture acidizing, sand control treatments, and the like.

An example method of the present invention for treating a subterranean formation generally comprises: providing a foamed treatment fluid comprising water, a gas, and a foaming and foam stabilizing surfactant mixture, the foaming and foam stabilizing surfactant mixture comprising an alkali salt of an alkyl ether sulfate, an alkyl amidopropyl amphoteric surfactant selected from the group consisting of an alkyl amidopropyl hydroxysultaine, an alkyl amidopropyl betaine, and combinations thereof, and an alkyl amidopropyl dimethylamine oxide, wherein the alkali salt of the alkyl ether sulfate comprises an alkali salt of a $C_{6-10}$ alkyl ether sulfate, and an alkali salt of a $C_4$ alkyl ether sulfate; and introducing the foamed treatment fluid into the subterranean formation.

Another example method of the present invention for fracturing a subterranean formation generally comprises: providing a foamed treatment fluid of the present invention comprising water, a gas, and a foaming and foam stabilizing surfactant mixture, the foaming and foam stabilizing surfactant mixture comprising an alkali salt of an alkyl ether sulfate, an alkyl amidopropyl amphoteric surfactant selected from the group consisting of an alkyl amidopropyl hydroxysultaine, an alkyl amidopropyl betaine, and combinations thereof, and an alkyl amidopropyl dimethylamine oxide, wherein the alkali salt of the alkyl ether sulfate comprises an alkali salt of a $C_{6-10}$ alkyl ether sulfate, and an alkali salt of a $C_4$ alkyl ether sulfate; and introducing the foamed treatment fluid into the subterranean formation at or above a pressure sufficient to create or enhance at least one fracture in the subterranean formation. At a desired time in the fracturing operation, proppant particulates may be included in the foamed treatment fluids of the present invention. After a desired time, the pressure maintained on the well bore during the fracturing treatment is released. Upon the release of the pressure, the gas contained in the foamed treatment fluid should expand and flow back to the surface, allowing for recovery of the foamed treatment fluid.

To facilitate a better understanding of the present invention, the following examples of certain aspects of some embodiments are given. In no way should the following examples be read to limit, or define, the scope of the invention.

EXAMPLE 1

In this example, a base gel was prepared that comprised a 2.7% potassium nitrate solution and LGC-IV™ gelling agent in a concentration of 40 pounds per 1,000 gallons. LGC-IV™ gelling agent, an oil suspension of CMHPG, is available from Halliburton Energy Services, Inc., Duncan, Okla. For complete hydration of the gelling agent, this mixture was stirred for 30 minutes in a Waring blender. Thereafter, an aqueous mixture that comprised water and a foaming and foam stabilizing surfactant mixture was added to the base gel in a concentration of 10 gallons per 1,000 gallons. The particular aqueous mixture comprising the foaming and foam stabilizing surfactant mixture that was included in the base gel was varied for each sample fluid that was prepared.

For Sample Fluid No. 1 (comparative), the aqueous mixture comprised water and cocamidopropyl betaine, a conventional foaming additive.

For Sample Fluid No. 2, the water was present in the aqueous mixture in an amount of about 40.71% by weight. The foaming and foam stabilizing surfactant mixture comprised about 66.48% by weight of an ammonium salt of an alkyl ether sulfate, about 16.07% by weight of a cocamidopropyl betaine, about 2.36% by weight of cocamidopropyl dimethylamine oxide, and about 14.99% by weight of sodium chloride, wherein the ammonium salt of the alkyl ether sulfate comprises about 75% by weight of an ammonium salt of a $C_{6-10}$ alkyl ether sulfate having about 1.8 moles of ethylene oxide substitution, and about 25% by weight of an ammonium salt of a $C_4$ alkyl ether sulfate having about 2 moles of ethylene oxide substitution.

For Sample Fluid No. 3, the water was present in the aqueous mixture in an amount of about 43.4% by weight. The foaming and foam stabilizing surfactant mixture comprised about 71.54% by weight of an ammonium salt of an alkyl ether sulfate, about 15.20% by weight of a cocamidopropyl hydroxysultaine, about 2.54% by weight of cocamidopropyl dimethylamine oxide, and about 10.71% by weight of sodium chloride, wherein the ammonium salt of the alkyl ether sulfate comprises about 75% by weight of an ammonium salt of a $C_{6-10}$ alkyl ether sulfate having about 1.8 moles of ethylene oxide substitution, and about 25% by weight of an ammonium salt of a $C_4$ alkyl ether sulfate having about 2 moles of ethylene oxide substitution.

After preparation, each sample fluid was foamed and tested in accordance with the following procedure. The following experimental procedure is described in detail in SPE 12026, "Rheological Study of Foam Treatment fluids Using Nitrogen and Carbon Dioxide" by Reidenback, V. C. et al.

First, each sample fluid was pumped into a recirculating flow loop viscometer and pressurized to 1,000 psi at about 75° F. The desired gas phase was bled into the loop while recirculating at a shear rate of 1,000 $sec^{-1}$. A foam that contained 70% nitrogen by volume was generated by displacing 479 milliliters of liquid from the 685 ml volume loop. After injection of the appropriate amount of the nitrogen, the foam was circulated for five minutes at a shear rate of 1000 $sec^{-1}$ to reach equilibrium texture.

Figure 1:
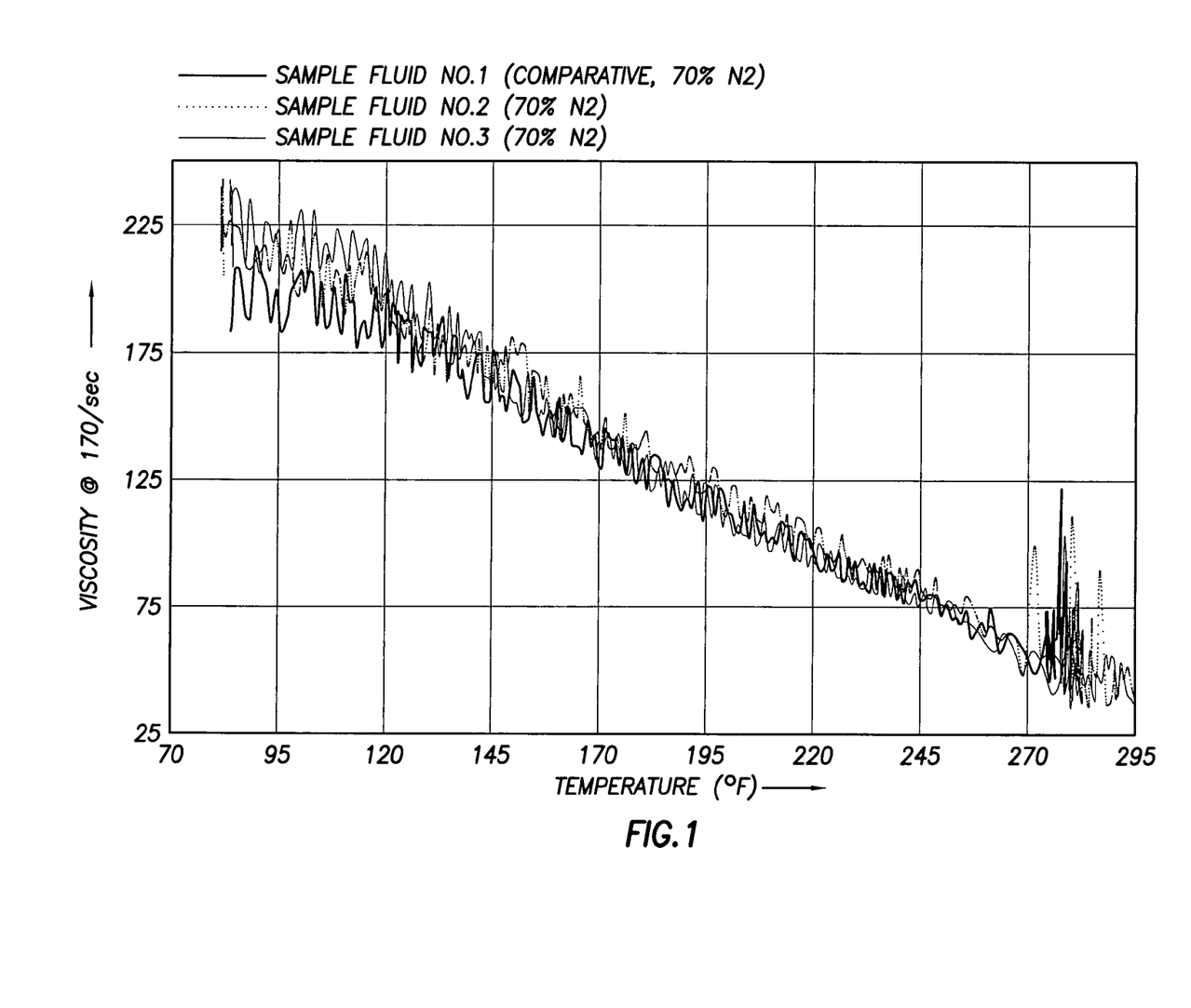
FIG. 1 is a plot of viscosity versus temperature for foamed sample fluids containing 70% nitrogen.

After initial equilibration, the shear rate was lowered to 170 $sec^{-1}$ and the temperature was linearly increased from room temperature to a maximum of 300° F. Viscosity was measured as a function of temperature while the temperature was increased. The viscosity measured as a function of temperature for each foam is displayed in FIG. 1. The foam prepared from Sample Fluid No. 1 (comparative) became unstable at a temperature of about 275° F. The foam prepared from Sample Fluid No. 2 became unstable at a temperature of about 270° F. And the foam prepared from Sample Fluid No. 3 became unstable at a temperature of about 285° F.

Accordingly, this example shows that the foamed and stabilizing additives used in the treatment fluids of the present invention provide a foam having a stability that is comparable to conventional foaming additives.

EXAMPLE 2

Sample Fluid No. 2 and Sample Fluid No. 3 from Example 1 were used in this example to test a 60% carbon dioxide/10% nitrogen foam. After preparation of the sample fluids as described above in Example 1, each fluid was foamed and tested in accordance with the following procedure. The following experimental procedure is described in detail in SPE 12026, "Rheological Study of Foam Treatment fluids Using Nitrogen and Carbon Dioxide" by Reidenback, V. C. et al.

First, each sample fluid was pumped into a recirculating flow loop viscometer and pressurized to 1,000 psi at about 75° F. A foam that contained a mixture of nitrogen and carbon dioxide was prepared. First, nitrogen was bled into the loop while recirculating at a shear rate of 1,000 $sec^{-1}$. The nitrogen was used to displace 137 milliliters of liquid from the 685 ml volume loop. Next, carbon dioxide was bled into the loop while recirculating at a shear rate of 1,000 $sec^{-1}$ to a total of 70% displacement. After injection of the appropriate amount of the nitrogen and carbon dioxide, the foam was circulated for five minutes at a shear rate of 1000° $sec^{-1}$ to reach equilibrium texture.

Figure 2:
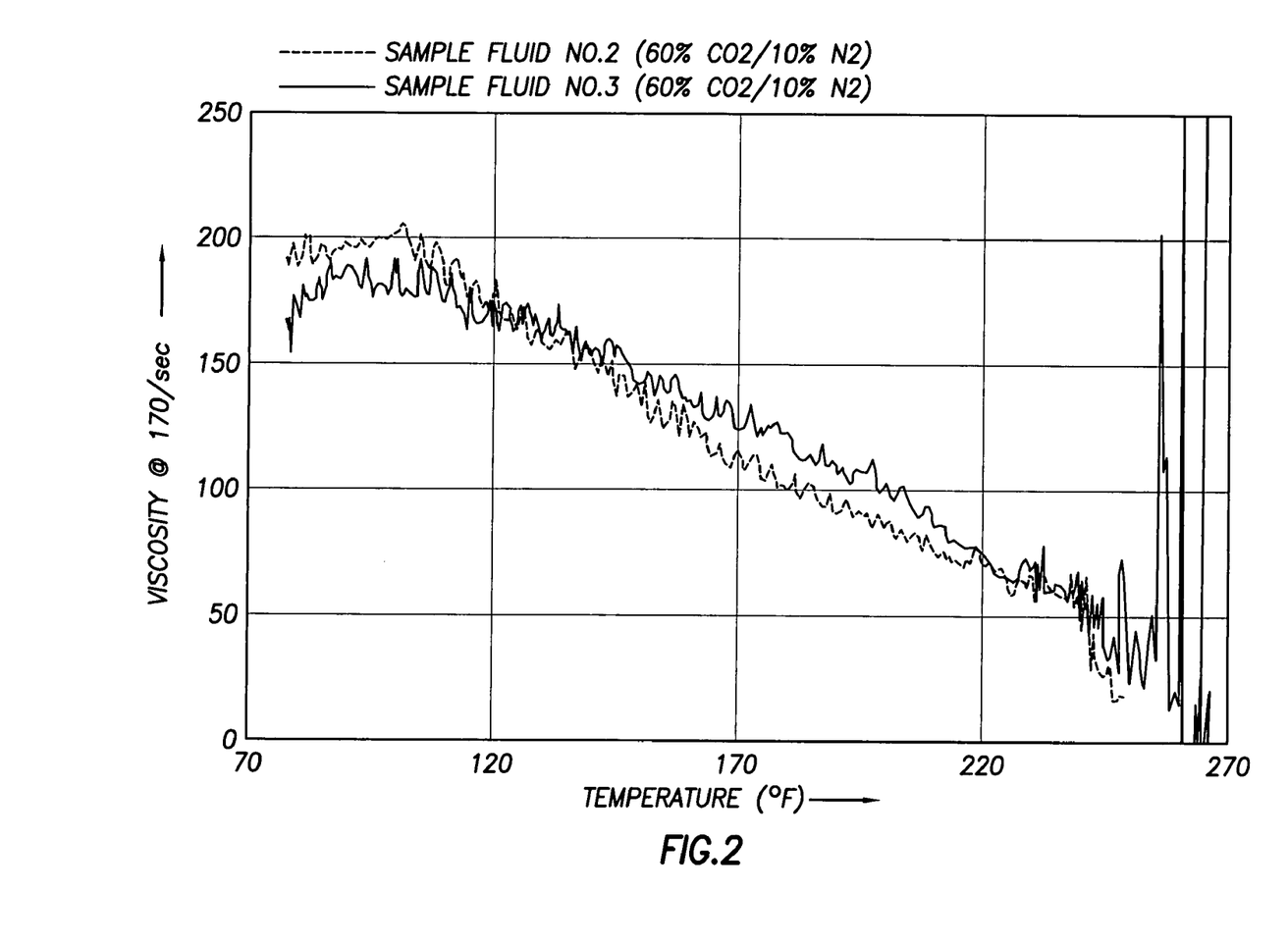
FIG. 2 is a plot of viscosity versus temperature for foamed sample fluids containing 10% nitrogen and 60% carbon dioxide.

After initial equilibration, the shear rate was lowered to 170 $sec^{-1}$ and the temperature was linearly increased from room temperature to a maximum of 300° F. Viscosity was measured as a function of temperature while the temperature was increased. The viscosity measured as a function of temperature for each foam is displayed in FIG. 2. The foam prepared from Sample Fluid No. 2 became unstable at a temperature of about 240° F. The foam prepared from Sample Fluid No. 3 became unstable at a temperature of about 260° F.

Accordingly, this example shows that the foaming and foam stabilizing surfactant mixture used in the treatment fluids of the present invention provide a stable foam when foamed with a mixture of nitrogen and carbon dioxide.

EXAMPLE 3

In this example, Sample Fluid No. 4 was prepared by first preparing a base gel that comprised a 2.7% potassium nitrate solution and CMHPG powder in a concentration of 40 pounds per 1,000 gallons. For complete hydration of the gelling agent, this mixture was stirred for 30 minutes in a Waring blender. Thereafter, an aqueous mixture that comprised water and a foaming and foaming stabilizing mixture was added to the base gel in a concentration of 5 gallons per 1,000 gallons. The water was present in the aqueous mixture in an amount of about 43.3% by weight. The foaming and foam stabilizing surfactant mixture used comprised about 71.54% by weight of an ammonium salt of an alkyl ether sulfate, about 15.20% by weight of a cocamidopropyl hydroxysultaine, about 2.54% by weight of cocamidopropyl dimethylamine oxide, and about 10.71% by weight of sodium chloride, wherein the ammonium salt of the alkyl ether sulfate comprises about 75% by weight of an ammonium salt of a $C_{6-10}$ alkyl ether sulfate having about 1.8 moles of ethylene oxide substitution, and about 25% by weight of an ammonium salt of a $C_4$ alkyl ether sulfate having about 2 moles of ethylene oxide substitution. Immediately, prior to testing, a liquid zirconium crosslinking agent was added in a concentration of 2.1 gallons per 1,000 gallons.

After preparation of Sample Fluid No. 4, the sample fluid was foamed and tested in accordance with the following procedure. The following experimental procedure is described in detail in SPE 12026, "Rheological Study of Foam Treatment fluids Using Nitrogen and Carbon Dioxide" by Reidenback, V. C. et al.

First, Sample Fluid No. 4 was pumped into a recirculating flow loop viscometer and pressurized to 1,000 psi at about 75° F. The desired gas phase was bled into the loop while recirculating at a shear rate of 1,000 $sec^{-1}$. A foam that contained 40% carbon dioxide by volume was generated by displacing 275 milliliters of liquid from the 685 ml volume loop. After injection of the appropriate amount of the carbon dioxide, the foam was circulated for five minutes at a shear rate of 1000 $sec^{-1}$ to reach equilibrium texture.

Figure 3:
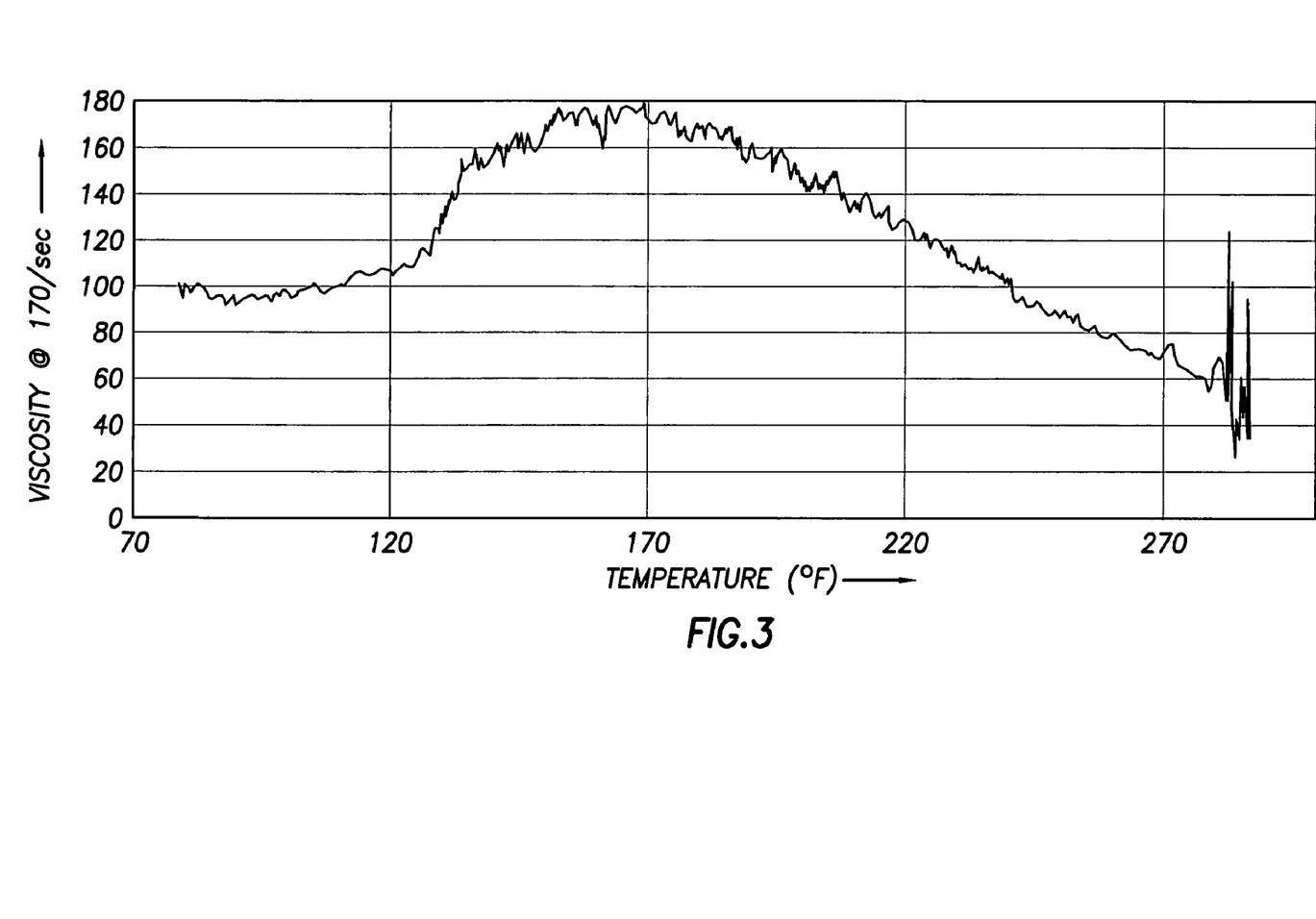
FIG. 3 is a plot of viscosity versus temperature for a foamed and crosslinked sample fluid containing 40% carbon dioxide.

After initial equilibration, the shear rate was lowered to 170 $sec^{-1}$ and the temperature was linearly increased from room temperature to a maximum of 300° F. Viscosity was measured as a function of temperature while the temperature was increased. The viscosity measured as a function of temperature for the foam is displayed in FIG. 3. The foam prepared from Sample Fluid No. 4 became unstable at a temperature of about 280° F.

Accordingly, this example shows that the foaming and foam stabilizing surfactant mixture used in the treatment fluids of the present invention provide a stable foam when used to foam a crosslinked gel.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A foamed treatment fluid comprising:
   water;
   a gas; and
   a foaming and foam stabilizing surfactant mixture comprising:
   an alkali salt of an alkyl ether sulfate, wherein the alkali salt of the alkyl ether sulfate comprises an alkali salt of a $C_{6-10}$ alkyl ether sulfate, and an alkali salt of a $C_4$ alkyl ether sulfate;
   an alkyl amidopropyl amphoteric surfactant comprising at least one alkyl amidopropyl amphoteric surfactant selected from the group consisting of an alkyl amidopropyl hydroxysultaine, an alkyl amidopropyl betaine, and any combination thereof, and
   an alkyl amidopropyl dimethylamine oxide; and
   a gelling agent.

2. The foamed treatment fluid of claim 1 wherein the alkali salt of the $C_{6-10}$ alkyl ether sulfate has in range of from about 1.5 moles to about 2 moles of ethylene oxide substitution, and the alkali salt of the $C_4$ alkyl ether sulfate has in range of from about 1.8 moles to about 2.5 moles of ethylene oxide substitution.

3. The foamed treatment fluid of claim 1 wherein the alkali salt of the $C_{6-10}$ alkyl ether sulfate is present in the alkali salt of the ether sulfate in an amount in the range of from about 60% to about 75% by weight of the alkali salt of the alkali ether sulfate, and the alkali salt of the $C_4$ alkyl ether sulfate is present in the alkali salt of the ether sulfate in an amount in the range of from about 10% to about 35% by weight of the alkali salt of the alkali ether sulfate.

4. The foamed treatment fluid of claim 1 the alkali salt of the alkyl ether sulfate comprises an ammonium salt of the alkyl ether sulfate.

5. The foamed treatment fluid of claim 1 wherein the alkali salt of the alkyl ether sulfate further comprise an ammonium sulfate.

6. The foamed treatment fluid of claim 1 wherein the alkyl amidopropyl amphoteric surfactant comprises the alkyl amidopropyl hydroxysultaine, the alkyl amidopropyl hydroxysultaine comprising a radical selected from the group consisting of a decyl radical, a cocoyl radical, a lauryl radical, a cetyl radical, and an oleyl radical.

7. The foamed treatment fluid of claim 1 wherein the alkyl amidopropyl amphoteric surfactant comprises the alkyl amidopropyl hydroxysultaine, the alkyl amidopropyl hydroxysultaine comprising a cocoyl radical.

8. The foamed treatment fluid of claim 1 wherein the alkyl amidopropyl amphoteric surfactant comprises the alkyl amidopropyl betaine, the alkyl amidopropyl betaine comprising a radical selected from the group consisting of a decyl radical, a cocoyl radical, a lauryl radical, a cetyl radical, and an oleyl radical.

9. The foamed treatment fluid of claim 1 wherein the alkyl amidopropyl amphoteric surfactant comprises the alkyl amidopropyl betaine, the alkyl amidopropyl betaine comprising a cocoyl radical.

10. The foamed treatment fluid of claim 1 wherein the alkyl amidopropyl dimethylamine oxide comprises a cocamidopropyl dimethylamine oxide.

11. The foamed treatment fluid of claim 1:
    wherein the alkali salt of the alkyl ether sulfate is present in the foaming and foam stabilizing surfactant mixture in an amount in the range of from about 60% to about 75% by weight of the surfactant mixture;
    wherein the alkyl amidopropyl amphoteric surfactant is present in the foaming and foam stabilizing surfactant mixture in an amount in the range of from about 15% to about 25% by weight of the surfactant mixture; and
    wherein the alkyl amidopropyl dimethylamine oxide is present in the foaming and foam stabilizing surfactant mixture in an amount in the range of from about 1% to about 10% by weight of the surfactant mixture.

12. The foamed treatment fluid of claim 1 wherein the foaming and foam stabilizing surfactant mixture further comprises an alkali salt comprising at least one member selected from the group of sodium chloride, ammonium chloride, potassium chloride and any combination thereof.

13. The foamed treatment fluid of claim 1 wherein the foaming and foam stabilizing surfactant mixture is present in the foamed treatment fluid in an amount in the range of from about 0.2% to about 2.0% by volume of the water present in the foamed treatment fluid.

14. The foamed treatment fluid of claim 1 wherein the foamed treatment fluid further comprises proppant particulates.

15. A foamed fracturing fluid comprising:
    water;
    a gas; and
    a foaming and foam stabilizing surfactant mixture comprising:
    an alkali salt of an alkyl ether sulfate, wherein the alkali salt of the alkyl ether sulfate comprises an alkali salt of a $C_{6-10}$ alkyl ether sulfate, and an alkali salt of a $C_4$ alkyl ether sulfate,
    an alkyl amidopropyl amphoteric surfactant comprising at least one alkyl amidopropyl amphoteric surfactant selected from the group consisting of an alkyl amidopropyl hydroxysultaine, an alkyl amidopropyl betaine, and any combination thereof, and
    an alkyl amidopropyl dimethylamine oxide;
    proppant particulates; and
    a gelling agent.

16. The foamed fracturing fluid of claim 15:
    wherein the alkali salt of the alkyl ether sulfate is present in the foaming and foam stabilizing surfactant mixture in an amount in the range of from about 60% to about 75% by weight of the surfactant mixture;
    wherein the alkyl amidopropyl amphoteric surfactant is present in the foaming and foam stabilizing surfactant mixture in an amount in the range of from about 15% to about 25% by weight of the surfactant mixture; and
    wherein the alkyl amidopropyl dimethylamine oxide is present in the foaming and foam stabilizing surfactant mixture in an amount in the range of from about 1% to about 10% by weight of the surfactant mixture.

17. The foamed fracturing fluid of claim 15 wherein the alkyl amidopropyl amphoteric surfactant comprises the alkyl amidopropyl betaine, the alkyl amidopropyl betaine comprising a cocoyl radical.

18. The foamed fracturing fluid of claim 15 wherein the alkyl amidopropyl amphoteric surfactant comprises an alkyl amidopropyl hydroxysultaine, the alkyl amidopropyl hydroxysultaine comprising a cocoyl radical.

19. A foamed treatment fluid comprising:
  water;
  a gelling agent;
  a gas; and
  a foaming and foam stabilizing surfactant mixture comprising:
    an ammonium salt of an alkyl ether sulfate, wherein the ammonium salt of the alkyl ether sulfate comprises an ammonium salt of a $C_{6-10}$ alkyl ether sulfate having in the range of from about 1.5 moles to about 2 moles of ethylene oxide substitution, and an alkali salt of a $C_4$ alkyl ether sulfate having in the range of from about 1.8 to about 2.5 moles of ethylene oxide substitution,
    a cocamidopropyl amphoteric surfactant selected from the group consisting of a cocamidopropyl hydroxysultaine, a cocamidopropyl betaine, and combinations thereof, and
    a cocamidopropyl dimethylamine oxide.

20. The foamed treatment fluid of claim 19 wherein the foamed treatment fluid further comprises proppant particulates.

\* \* \* \* \*